(12) United States Patent
Richter et al.

(10) Patent No.: US 11,905,977 B2
(45) Date of Patent: Feb. 20, 2024

(54) JET PUMP UNIT HAVING AN AXIS OF A NOZZLE AND AN AXIS OF A MIXING TUBE OFFSET BY AN ANGLE

(71) Applicant: Robert Bosch GmbH, Stuttgart (DE)

(72) Inventors: Armin Richter, Leinfelden-Echterdingen (DE); Hans-Christoph Magel, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 228 days.

(21) Appl. No.: 17/422,243

(22) PCT Filed: Dec. 30, 2019

(86) PCT No.: PCT/EP2019/087133
§ 371 (c)(1),
(2) Date: Jul. 12, 2021

(87) PCT Pub. No.: WO2020/148079
PCT Pub. Date: Jul. 23, 2020

(65) Prior Publication Data
US 2022/0082114 A1 Mar. 17, 2022

(30) Foreign Application Priority Data
Jan. 18, 2019 (DE) .................... 10 2019 200 613.2

(51) Int. Cl.
*F04F 5/20* (2006.01)
*F04F 5/46* (2006.01)
(Continued)

(52) U.S. Cl.
CPC ............... *F04F 5/20* (2013.01); *F04F 5/463* (2013.01); *F04F 5/52* (2013.01); *F04F 5/54* (2013.01);
(Continued)

(58) Field of Classification Search
CPC ...... F04F 5/20; F04F 5/463; F04F 5/52; F04F 5/14; F04F 5/18; F04F 99/00
See application file for complete search history.

(56) References Cited

U.S. PATENT DOCUMENTS 4,141,701 A * 2/1979 Ewan ............. B01D 47/10
261/78.2
6,296,454 B1 * 10/2001 Schmid ............ F04F 5/463
417/198
(Continued)

FOREIGN PATENT DOCUMENTS

DE 102010031548 A1 1/2012
DE 102010043618 A1 5/2012
(Continued)

OTHER PUBLICATIONS

Translation of International Search Report for Application No. PCT/EP2019/087133 dated Mar. 26, 2020 (2 pages).

*Primary Examiner* — Nathan C Zollinger
*Assistant Examiner* — Timothy P Solak
(74) *Attorney, Agent, or Firm* — Michael Best & Friedrich LLP

(57) ABSTRACT

The invention relates to a jet pump unit (46) for controlling a gaseous medium, in particular hydrogen, comprising a nozzle (1) and a mixing tube unit (30), said mixing tube unit (30) having a longitudinal axis (48) and the nozzle (1) a longitudinal axis (18). The longitudinal axis (48) of the mixing tube unit (48) and the longitudinal axis (18) of the nozzle (1) include an angle (α) with each other.

12 Claims, 1 Drawing Sheet

(51) Int. Cl.
 *F04F 5/52* (2006.01)
 *F04F 5/54* (2006.01)
 *F04F 5/16* (2006.01)

(52) U.S. Cl.
 CPC . *F04F 5/16* (2013.01); *F04F 5/46* (2013.01); *Y02E 60/50* (2013.01)

(56) References Cited

U.S. PATENT DOCUMENTS

| | | | | |
|---|---|---|---|---|
| 6,364,626 | B1* | 4/2002 | Popov | F04F 5/46 |
| | | | | 417/151 |
| 6,706,438 | B2* | 3/2004 | Sahoda | F04F 5/54 |
| | | | | 137/111 |
| 7,275,732 | B2* | 10/2007 | Kato | H01M 8/04231 |
| | | | | 251/363 |
| 7,438,535 | B2* | 10/2008 | Morishima | F04F 5/54 |
| | | | | 417/187 |
| 10,072,674 | B2 | 9/2018 | Volker et al. | |
| 2005/0044881 | A1* | 3/2005 | Ogata | F25B 9/008 |
| | | | | 62/500 |
| 2008/0314578 | A1 | 12/2008 | Jackson | |
| 2014/0329156 | A1 | 11/2014 | Mathie et al. | |
| 2017/0244119 | A1* | 8/2017 | Koyama | F04F 5/16 |

FOREIGN PATENT DOCUMENTS

| | | |
|---|---|---|
| DE | 102016207459 A1 | 11/2017 |
| DE | 102017212726 B3 | 9/2018 |
| GB | 173542 A | 1/1922 |
| JP | 2002117880 A | 4/2002 |
| JP | 2010186730 A | 8/2010 |
| RU | 2007624 C1 | 2/1994 |
| SU | 737707 A1 | 5/1980 |

* cited by examiner

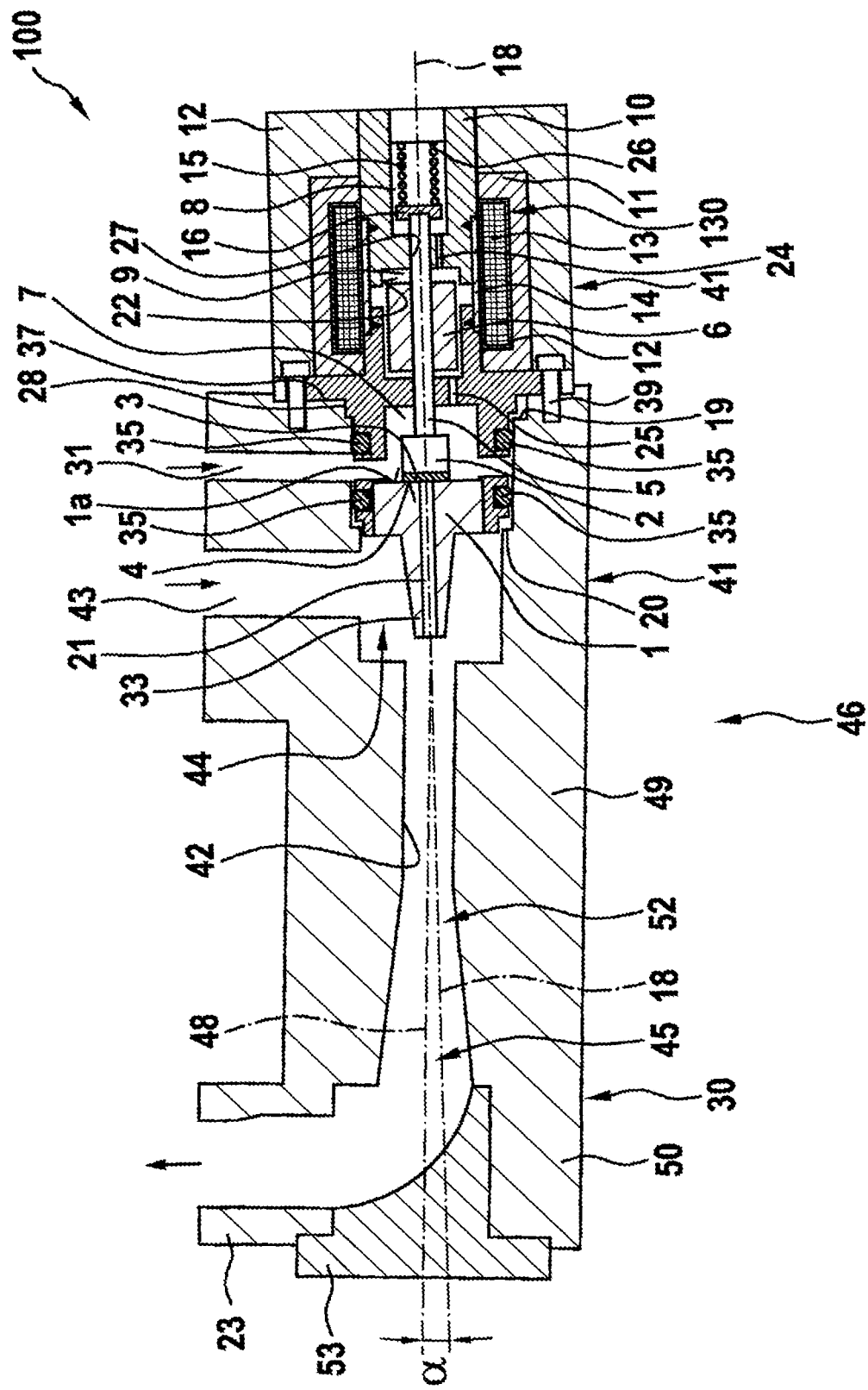

JET PUMP UNIT HAVING AN AXIS OF A NOZZLE AND AN AXIS OF A MIXING TUBE OFFSET BY AN ANGLE

BACKGROUND

The invention relates to a jet pump unit for controlling a gaseous medium, in particular hydrogen, for example for use in vehicles having a fuel cell drive.

DE 10 2010 043 618 A1 describes a dosing valve for controlling a gaseous medium, in particular hydrogen, wherein the dosing valve comprises a valve housing, an ejector unit, an actuator and a closure element. In the valve housing, there is formed a passage opening which can be opened up or closed off by the closure element at a valve seat. The ejector unit comprises an inflow region, to which a first gaseous medium is supplied under pressure, an intake region, where a second medium is present, and a mixing tube region, from which a mixture of the first and the second gaseous medium exits. The passage opening is arranged between the inflow region and the intake region of the ejector unit.

Optimization of flushing processes in an anode path of a fuel cell arrangement can be achieved by a combination of a dosing valve and a jet pump. The position of installation of the dosing valve into the jet pump is limited, however, since the jet pump is typically arranged parallel to an end plate of the fuel cell stack. Consequently, the gaseous medium, hydrogen in this case, which flows from the jet pump in the direction of the fuel cell stack has to be diverted through 90°. The diversion can give rise to an asymmetrical pressure field in the jet pump, which can lead to impairment of the functioning of the jet pump.

SUMMARY

The jet pump unit according to the invention for controlling a gaseous medium, in particular hydrogen, has by contrast the advantage that, despite a predetermined position of installation of the jet pump unit, an optimized flow for efficient functioning of the jet pump unit is achieved.

For this purpose, the jet pump unit for controlling a gaseous medium, in particular hydrogen, has a nozzle and a mixing tube unit, wherein the mixing tube unit has a longitudinal axis and the nozzle has a longitudinal axis. Furthermore, the longitudinal axis of the mixing tube unit and the longitudinal axis of the dosing valve are at an angle α to one another.

As a result of the non-coaxial arrangement of the nozzle in the mixing tube unit, flow into the mixing tube unit from one side can be counteracted such that, even despite flow diversion, no asymmetrical pressure field is formed in the mixing tube unit. Beside optimal functioning of the entire jet pump unit, this leads to efficient functioning of the fuel cell too.

In a first advantageous refinement, it is provided that the angle α lies between 2° and 5°. An optimum angle value range can be determined by means of numerical fluid mechanics calculations or computational fluid dynamics (CFD) methods.

In a further configuration of the invention, it is advantageously provided that the mixing tube unit has an outflow channel, which outflow channel is in the form of a transverse bore in a pump housing of the mixing tube unit and is in this way arranged radially with respect to the longitudinal axis of the mixing tube unit. It is thus possible in a simple manner for the gaseous medium, for example hydrogen, to be guided from the jet pump unit in the direction of a fuel cell.

In an advantageous refinement, the longitudinal axis of the nozzle is inclined away from the direction of the outflow channel in the mixing tube unit. In this way, disturbances in the pressure field of the gaseous medium can be minimized. For further optimization of the pressure field, the longitudinal axis of the nozzle can also be pivoted into a further direction. In this way, it is possible to compensate in particular for disturbances which originate from the inlet of the jet pump unit.

In a further configuration of the invention, it is advantageously provided that the mixing tube unit has a flow-guiding element, which flow-guiding element is in the form of a cover element at an end of the mixing tube unit at the outflow channel and is integrated into the pump housing, whereby a flow of gaseous medium, preferably hydrogen, in the mixing tube unit can be diverted into the direction of the outflow channel. It is thus possible in a simple manner for the gaseous medium, in particular hydrogen, to be guided in the direction of the fuel cell.

In an advantageous refinement, the mixing tube unit has a pump housing, in which pump housing a stepped passage bore is formed, wherein the nozzle is received fully in the passage bore of the mixing tube unit. The nozzle advantageously has a protuberance, which protuberance projects into an intake region of the mixing tube unit. In this way, it is possible to optimize the flow of the gaseous medium within the mixing tube unit.

In a further configuration of the invention, it is advantageously provided that the nozzle is arranged on a dosing valve with a valve housing and is connected fixedly to the valve housing. The dosing valve makes possible precise dosing of gaseous medium into the mixing tube unit and thus for example into an anode region of a fuel cell, with the result that optimum functioning of the entire system, for example of the fuel cell system, can be achieved.

In an advantageous refinement, a passage opening of the dosing valve is formed in the nozzle, wherein the passage opening opens out into the passage bore. The dosing valve advantageously has a closure element with an elastic sealing element, which closure element interacts with a valve seat for opening and closing the passage opening and is in the form of a flat seat at the nozzle. The use of a flat valve seat in combination with an elastic sealing element for sealing-off at the valve seat makes it possible to ensure, in a simple manner and without large structural changes, the tightness of the dosing valve, so that for example no hydrogen can exit the dosing valve.

In an advantageous refinement, the dosing valve has an inflow channel for the gaseous medium, wherein the inflow channel is formed at least partially in the pump housing. The pump housing of the mixing tube unit advantageously has at least one step, by way of which at least one step the dosing valve is guided in the pump housing. In this way, the dosing valve can be integrated in a structurally simple manner into the mixing tube unit for optimum functioning.

The jet pump unit described is preferably suitable in a fuel cell arrangement for controlling a supply of hydrogen to an anode region of a fuel cell. The small pressure variations in the anode path and low-noise operation are advantages.

BRIEF DESCRIPTION OF THE DRAWINGS

The drawing illustrates exemplary embodiments of a jet pump unit according to the invention for controlling a supply of gas, in particular hydrogen, to a fuel cell. In the drawing:

FIG. 1 shows, in longitudinal section, an exemplary embodiment of a jet pump unit according to the invention with a dosing valve and with a mixing tube unit.

DETAILED DESCRIPTION

FIG. 1 shows, in longitudinal section, an exemplary embodiment of a jet pump unit 46 according to the invention for controlling a gaseous medium, in particular hydrogen, with a dosing valve 100 and with a mixing tube unit 30.

The jet pump unit 46 has a jet pump housing 41, which comprises a pump housing 49 of the mixing tube unit 30 and a valve housing 12 of the dosing valve 100.

An interior space 26 is formed in the valve housing 12 of the dosing valve 100, in which interior space an electromagnet 130 comprising a magnet coil 13, an inner pole 10 and an outer pole 11 is arranged. Here, the inner pole 10 is connected to the valve housing 12 via a spacer bush element 14 composed of non-magnetic material.

Furthermore, a magnet armature 6 which can perform lifting movements and has a pin-like element 5 is arranged in an armature space 9 comprised by the interior space 26, wherein the pin-like element 5 is connected fixedly to the magnet armature 6 and is received and guided both in a cutout 27 of the inner pole 10 and in a cutout 28 of the valve housing 12. The magnet armature 6 is in the form of a solenoid plunger and, during the lifting movement thereof, is received in a cutout 22 of the inner pole 10.

The valve housing 12 and the inner pole 10 delimit a spring space 8 into which a disk-shaped end 16 of the pin-like element 5 of the magnet armature 6 projects. Supported against the disk-shaped end 16 of the pin-like element 5 is a closure spring 15, by which the magnet armature 6 is preloaded by way of the pin-like element 5. That end of the pin-like element 5 which faces away from the closure spring 15 is connected fixedly to a flat closure element 2. The closure element 2 has at the end thereof facing away from the pin-like element 5 an elastic sealing element 3 and is arranged in an inflow region 7 of the dosing valve 100. The spring space 8 and the armature space 9 are connected fluidically to one another via a first connecting channel 24, and the armature space 9 and the inflow region 7 are connected fluidically to one another via a second connecting channel 25.

Inflow channels 31 are formed radially with respect to a longitudinal axis 18 of the dosing valve 100 in the valve housing 12, through which inflow channels the inflow region 7 of the dosing valve 100 can be filled with gaseous medium. Beside the valve housing 12, a nozzle 1 having a protuberance 33 in which a stepped passage opening 21 is formed delimits the inflow region 7. On a seat surface 1a of the nozzle 1, which seat surface faces the elastic sealing element 3 and is arranged radially with respect to the longitudinal axis 18 of the dosing valve 100, there is formed a circumferential sealing edge at which a valve seat 4 is formed. In a closed position of the dosing valve 100, the elastic sealing element 3 bears by way of application of force of the closure spring 15 against the valve seat 4, with the result that a connection between the inflow region 7 and the passage opening 21 is closed.

The mixing tube unit 30 has the pump housing 49 with a longitudinal axis 48. A partially stepped and partially conical passage bore 42 is formed axially with respect to the longitudinal axis 48 in the pump housing 49. The inflow channel 31 of the dosing valve 100 and an intake channel 43 are formed radially with respect to the longitudinal axis 48 in the pump housing 49.

Furthermore, an intake region 44, a mixing tube region 52 and, at one end 50 of the mixing tube unit 30, an outflow region 45 are formed in the passage bore 42. At said end 50, an outflow channel 23 is formed radially with respect to the longitudinal axis 48 of the mixing tube unit 30, which outflow channel is connected to a fuel cell of a fuel cell arrangement for example for the purpose of supplying hydrogen. Moreover, a flow-guiding element 53 in the form of a cover element is arranged, and integrated into the pump housing 49, at the end 50. Consequently, the gaseous medium in the passage bore 42 can be diverted into the direction of the outflow channel 23.

The dosing valve 100 is partially received in an opening of the pump housing 49. Here, the valve housing 12 is arranged on the pump housing 49 by way of a step 37 and is connected fixedly to said pump housing by means of screw elements 39. Furthermore, seal elements 35 are arranged on the valve housing 12 such that the valve housing 12 and the pump housing 49 are sealed off with respect to one another. Gaseous medium from the inflow channel 31 thus passes in the direction of the intake region 44 only via the passage opening 21.

Furthermore, the pump housing 49 has a first step 19 and a second step 20, by way of which the dosing valve 100 and the nozzle 1 thereof are guided in the pump housing 49, and consequently the nozzle 1 is optimally oriented upstream of the mixing tube region 52. In this way, it is possible to minimize the positional tolerances of the dosing valve 100, especially the nozzle 1, with respect to the pump housing 49 in interaction with the first step 19 and the second step 20.

Here, the dosing valve 100 is not integrated into the mixing tube unit 30 in a coaxial manner, but rather the longitudinal axis 18 of the dosing valve 100 and the longitudinal axis 48 of the mixing tube unit 30 are at an angle α with a value range between 2° and 5°. Here, the longitudinal axis 18 of the dosing valve 100 is inclined away from the direction of the outflow channel 23 in the mixing tube unit 30.

The functioning of the jet pump unit is as follows:

The dosing valve 100 is in the form of a proportional valve here. When the magnet coil 13 is not electrically energized, the closure element 2 is pressed against the valve seat 4 via the closure spring 15, with the result that the connection between the inflow region 7 and the passage opening 21 is interrupted and no throughflow of gas takes place.

If the magnet coil 13 is electrically energized, then a magnetic force on the magnet armature 6 is generated, this being directed counter to the closing force of the closure spring 15. Said magnetic force is transmitted via the pin-like element 5 to the closure element 2 such that the closing force of the closure spring 15 is overcompensated and the closure element 2 lifts off from the valve seat 4. A throughflow of gas from the inflow region 7 in the direction of the passage opening 21 is enabled.

The lift of the closure element 2 can be set via the magnitude of the current intensity at the magnet coil 13. The higher the current intensity at the magnet coil 13, the greater the lift of the closure element 2 is and the greater the throughflow of gas in the dosing valve 100 is too, since the force of the closure spring 15 is dependent on the lift. If the current intensity at the magnet coil 13 is reduced, the lift of the closure element 2 is reduced too and thus the throughflow of gas is throttled.

If the current at the magnet coil 13 is interrupted, the magnetic force on the magnet armature 6 is reduced, with the result that the force on the closure element 2 by means of the pin-like element 5 is reduced. The closure element 2 moves in the direction of the passage opening 21 and seals against the valve seat 4 by way of the elastic sealing element 3. The throughflow of gas in the dosing valve 100 is interrupted.

With an open or partially open valve seat 4 of the dosing valve 100, gaseous medium, hydrogen in this case, flows from the tank into the passage opening 21 in the nozzle 1 from the inflow channel 31 of the dosing valve 100 via the valve seat 4. This hydrogen flows via the nozzle 1 into the passage bore 42 of the pump housing 49. After entering the passage bore 42, the hydrogen impinges on gaseous medium in the intake region 44, which gaseous medium has already been supplied to the fuel cell but has not been consumed, and has been guided back into the jet pump unit 46 via the intake channel 43. The gaseous medium guided back comprises mainly hydrogen, but also water vapor and nitrogen. In the mixing tube region 52, by way of exchange of momentum of the gaseous media, a mass flow is sucked in from the intake region 44 and conveyed in the direction of the outflow region 45 and outflow channel 23 and thus in the direction of an anode region of the fuel cell. A demand-dependent setting of the gas flow supplied to the fuel cell may be realized according to the geometry of the passage bore 42 and the angle $\alpha$ between the longitudinal axis 18 of the dosing valve 100 and the longitudinal axis 48 of the mixing tube unit 30.

In an alternative embodiment, it is also possible that the dosing valve 100 is not, as shown in the above exemplary embodiment, integrated into the mixing tube unit 30, but for example is connected to the mixing tube unit 30 via a channel connection. The dosing valve 100 is then not screwed to the mixing tube unit 30. In this case, the nozzle 1 is still arranged in the mixing tube unit 30 at the same position and connected fixedly to the mixing tube unit 30.

What is claimed is:

1. A jet pump unit (46) for controlling a gaseous medium, the jet pump unit (46) having a nozzle (1) and a mixing tube unit (30), wherein the mixing tube unit (30) has a longitudinal axis (48) and the nozzle (1) has a longitudinal axis (18), wherein the longitudinal axis (48) of the mixing tube unit (30) and the longitudinal axis (18) of the nozzle (1) are at an angle $\alpha$ to one another,
    wherein the mixing tube unit (30) has an outflow channel (23), which outflow channel (23) is in the form of a transverse bore in a pump housing (49) of the mixing tube unit (30) and is arranged radially with respect to the longitudinal axis (48) of the mixing tube unit (30),
    wherein the longitudinal axis (18) of the nozzle (1) is inclined away from a direction of the outflow channel (23) in the mixing tube unit (30).

2. The jet pump unit (46) as claimed in claim 1, wherein the angle $\alpha$ is between 2° and 5°.

3. The jet pump unit (46) as claimed in claim 1, wherein the mixing tube unit (30) has a flow-guiding element (53), which flow-guiding element (53) is in the form of a cover element at an end (50) of the mixing tube unit (30) at the outflow channel (23) and is integrated into the pump housing (49), whereby a flow of gaseous medium in the mixing tube unit (30) can be diverted into the direction of the outflow channel (23).

4. The jet pump unit (46) as claimed in claim 1, wherein the pump housing (49) has a stepped passage bore (42), wherein the nozzle (1) is received fully in the stepped passage bore (42) of the mixing tube unit (30).

5. The jet pump unit (46) as claimed in claim 4, wherein the nozzle (1) is arranged on a dosing valve (100) with a valve housing (12) and is connected fixedly to the valve housing (12).

6. The jet pump unit (46) as claimed in claim 5, wherein a passage opening (21) of the dosing valve (100) is formed in the nozzle (1), wherein the passage opening (21) opens out into the stepped passage bore (42).

7. The jet pump unit (46) as claimed in claim 6, wherein the dosing valve (100) has a closure element (2) with an elastic sealing element (3), which closure element (2) interacts with a valve seat (4) for opening and closing the passage opening (21) and is in the form of a flat seat at the nozzle (1).

8. The jet pump unit (46) as claimed in claim 1, wherein the dosing valve (100) has an inflow channel (31) for the gaseous medium, wherein the inflow channel (31) is formed at least partially in the pump housing (49).

9. The jet pump unit (46) as claimed in claim 5, wherein the pump housing (49) of the mixing tube unit (30) has at least one step (19, 20), by way of which at least one step (19, 20) the dosing valve (100) is guided in the pump housing (49).

10. The jet pump unit (46) as claimed in claim 1, wherein the nozzle (1) has a protuberance (33), which protuberance (33) projects into an intake region (44) of the mixing tube unit (30).

11. A fuel cell arrangement with a jet pump unit (46) as claimed in claim 1 for controlling a supply of hydrogen to a fuel cell.

12. The jet pump unit (46) as claimed in claim 1, wherein the gaseous medium is hydrogen.

\* \* \* \* \*